June 21, 1932. L. E. WELCH 1,864,287
MANUFACTURE OF BUILDING MATERIAL
Filed Aug. 9, 1930
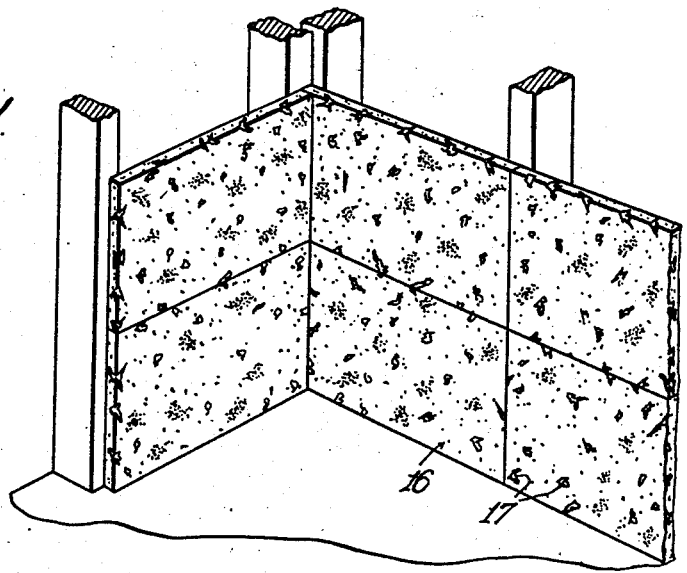
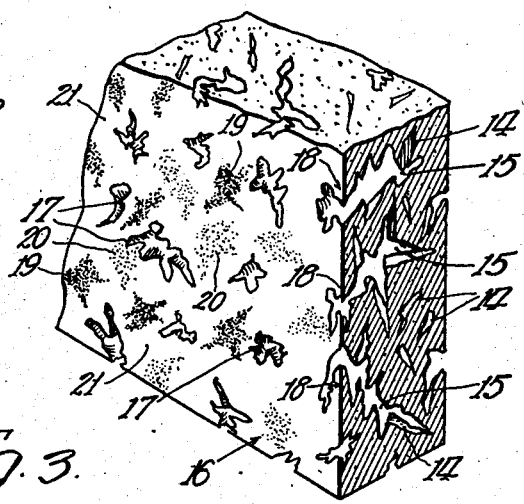
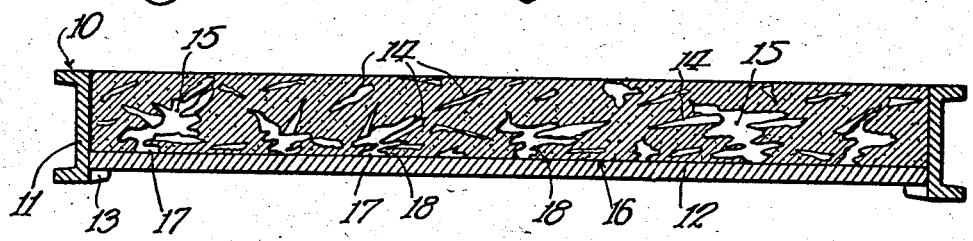
Inventor.
Lon Edward Welch Patented June 21, 1932

1,864,287

UNITED STATES PATENT OFFICE

LON EDWARD WELCH, OF JACKSON, MISSISSIPPI, ASSIGNOR TO ART MARBLE COMPANY OF AMERICA, OF JACKSON, MISSISSIPPI, A CORPORATION OF MISSISSIPPI

MANUFACTURE OF BUILDING MATERIAL

Application filed August 9, 1930. Serial No. 474,191.

This invention relates to building materials for walls and the like, and among other objects aims to provide an improved material which is decorative and has sound absorbing or "acoustical" properties.

The invention may be readily understood by reference to one embodiment thereof described in the following specification and illustrated in the accompanying drawing.

In said drawing:

Fig. 1 is a fragmentary perspective view of a wall structure surfaced with slabs of the inventive material;

Fig. 2 is a fragmentary perspective view of a slab of the material, one end being shown in section; and Fig. 3 is a transverse section of a mold for making flat slabs and showing a slab in place therein.

The illustrative material comprises a plastic magnesia cement containing a coarse aggregate which in its original condition is very loose in character, together with an appropriate pigment. The aggregate advantageously comprises relatively coarse, dry, wood chips or shavings such as planer-mill shavings. The plastic magnesia cement is in this instance formed of magnesium oxide (which is calcined but not dead burned and known technically as the alpha form of magnesium oxide, or as a caustic magnesium oxide suitable for making magnesium oxychloride or Sorel cement) and a reacting solution represented herein by a solution of magnesium chloride of a concentration of from 18 to 22 degrees Baumé. In the present case the concentration is about 22° Bé. The magnesium chloride serves to react with the magnesite and after several hours (depending upon temperatures) will cause the cement to set up into a remarkably strong cement which is somewhat elastic and resilient.

While the order of mixing the ingredient may be varied, it has been found advantageous for decorative purposes to mix the cement and pigment and then incorporate the aggregate. This avoids a premature absorption by the wood chips of too high an amount of magnesium chloride solution. If the magnesia and magnesium chloride be mixed alone the opportunity for intimate mixing of these chemically co-acting ingredients is better than with the aggregate present. The decorative result referred to is a more pleasing mottled color effect, presently described.

In the present case the amount of magnesium chloride (22° Bé.) added to the magnesia should be sufficient to produce a soft rather than stiff consistency owing to the stiffening effect of the large amount of aggregate subsequently incorporated. In fact the cement should be of a soupy consistency.

The amount of pigment (which may be one of the earth metal oxides) added to the cement depends, of course, on its strength and the intensity of color desired. It varies from about two percent (on the weight of magnesia) to seven or eight percent depending upon these factors. For example, for yellow ochre pigment from five to seven pounds per hundred pounds of magnesite is added.

The amount of wood shavings, by weight, should be almost equal to the dry weight of the magnesia used, i. e., for fifty pounds of shavings, about fifty-eight to sixty-five pounds of magnesia. This amount may be considerably varied depending upon the physical characteristics desired in the resulting product. To increase the plasticity of the mixture without an increase in the amount of magnesite (which would increase the hardness of the product), about five or six pounds of kieselguhr per hundred pounds of magnesia can advantageously be used. This also has the effect of reducing the danger of cracking or checking. For molded or sculptured products which are neither sawed nor nailed, the kieselguhr may be omitted and a greater quantity of magnesium chloride solution may be used without objection. In any event, to secure the most pleasing color effect the proportion of wood chips must not be so great as to prevent a flow of color on the molded surface of the material. On the other hand the sound absorbing properties of the material must be taken into account in increasing the proportion of magnesia cement.

After adequate mixing of all ingredients, the desired products may be molded by placing an adequate quantity of the mixture into an appropriate mold 10 whose surface should preferably be greased to prevent adhesion of the cement thereto and to facilitate stripping of the mold after the cement has set. The illustrative mold 10 (which may be employed for flat slabs—see Fig. 3) comprises a frame 11 rectangular in shape and carrying a removable bottom plate 12 which rests on portions 13 projecting inwardly from the sides of the mold. The bottom plate 12 presents a smooth surface which serves to form the face of the slab and upon which a small quantity of the cement collects so as to form a decorative cement surface which is substantially free from projecting or visible particles of wood. Such surface of course contains numerous openings or depressions which function in connection with the absorption of sound by the material.

In tamping the material into the molds the wood shavings 14 should not be crushed or flattened out but should be permitted to lie irregularly since they serve to form a multitude of irregular, enlarged cavities 15 in the interior of the material communicating with the face 16 of the material through openings 17 which are somewhat restricted by the collection of cement 18 at the face of the mold. In this connection the fluidity and proportion of the cement should not result in collection of so much cement on the face of the mold as would entirely close the cavities. The possibility of such a result can be minimized by tamping the material in small areas successively until it is adequately compacted and even on the back. Pressure which extends simultaneously over the entire area of the mold should preferably not be used since the result would be somewhat like pressing a wet sponge simultaneously throughout its area,—all the water would run down to the face. So with the present material,—a general pressure would tend to cause a large quantity of cement to run to the face of the mold and close the cavities. Whereas locally applied tamping, that is tamping the material in small areas successively, until the whole area was adequately tamped, avoid collection of an excessive quantity of cement at the face of the mold. In such tamping operations, cement temporarily squeezed out in a small area would be absorbed by the adjacent areas and would not run to the face of the mold.

The tamping of the materials also causes the shavings to interlock or intermesh sufficiently to produce (in conjunction with the cementing action of the cement) a strong, reinforced product.

While the product when first cast or molded seems to have a substantially uniform color contributed by the pigment, and the pigment appears to be substantially uniformly distributed, yet after a lapse of time the product, and particularly its smooth outer face 16, takes on a mottled appearance which is decidedly attractive and which contributes substantially to the desirability of the material. While it is impossible without the use of color accurately to illustrate or reproduce the aforesaid mottled effect in the drawing, the latter (Fig. 2) indicates roughly the character of the mottling, the areas 19 being the darkest areas, the areas 20 of a lighter shade and the areas 21 of a still lighter shade. The aforesaid areas are not uniform in color but include lighter or darker areas. They are, of course, irregular in shape. While the mottled effect is reproduced by the use of relatively large areas of absorptive materials such as wood shavings, yet the individual colored areas do not take the shapes of individual pieces of wood immediately adjacent the smooth or outer face of the material. One theory is that the non-uniform distribution of the pigment in the surface is caused by non-uniform distribution of moisture in the product, caused in this instance by the addition of dry wood shavings or chips. In other words, the absorptive properties of the aggregate probably cause a flow of moisture in the material carrying with it pigment and concentrating the pigment in localities of appreciable size. The darker areas are probably those areas toward which the moisture has traveled. That is, they are the wetter areas, though this is not certain. While the wood chips probably absorb some of the liquid, they do not apparently absorb any substantial amount of the pigment. In other words, the lighter areas of color are not always closer to a subjacent piece of wood than the darker areas. As stated above, the substantial size of the particles of aggregate is apparently responsible for the attractive mottled effect.

After the cement has set with the pigment non-uniformly distributed, subsequent wetting of the material does not cause a redistribution of pigment.

While the open cavities and interstices in the material contribute to the sound absorbing properties of the material, other characteristics of the material may, but to what extent is not known, contribute to the same result. For example, the shavings themselves and the very irregularity of the cavities and interstices may increase the sound absorption.

The material is ideal as a wall and ceiling surfacing material since it provides a durable decorative surface which at the same time has substantial sound absorbing properties. In this connection it should be understood that both the mottled color effect on the surface of the material and the pitted and irregular surface of the material contribute to the decorative effect, the pitted surface resembling travertine marble or some types of pitted stone. While absorbing sound the material nevertheless has a durable surface which may be washed and polished and which is not impaired by such wearing action as walls receive, particularly in public buildings. Because of the latter circumstance, it has heretofore been impractical to employ soft sound absorbing materials on walls where they could be touched, aside from the further objection that such materials inherently have no decorative value.

In Fig. 1 is illustrated, largely diagrammatically, a wall structure surfaced with the illustrative slabs. Being nailable, the slabs may be nailed directly to the studding or other wall structure and the nail heads countersunk and pointed up so as to conceal them. Preferably a pointing compound is placed between adjacent slabs so as to give the appearance of ashlar construction. In this connection the slabs may advantageously be of the conventional surface dimensions of stone blocks used for interior wall facing. A plurality of such slabs may be cut from a single molded slab whose dimensions are preferably such as to provide a number of whole slabs without waste.

The inventive material is admirably adapted for use in "acoustical" treatment of theaters and large halls where the ceiling surfaces and sometimes walls require ornamental and sculptural features. For such treatment, the mixture of ingredients is easily molded into plaster of Paris molds conforming to the desired design etc. In addition, a variety of colors may be employed, according to the desired color scheme. Thus the requisite sound absorption may be obtained in walls and ceilings which are beautifully colored and sculptured and which present durable wearing surfaces. As regards ornamental and sculptured effects magnesia cement is ideal because of its well known capacity for faithful reproduction of the design of the mold and for its smooth durable surface.

In view of the fact that walls as well as ceilings may be covered with the illustrative material it is not essential that the material have maximum sound absorbing efficiency. Compared with the soft sound absorbing materials which must be confined to ceilings (and are not in any case inherently decorative), the aggregate sound absorption in a room having its walls covered with my material is greater (because of the greater sound absorbing area) than in a room in which the ceiling alone is covered with the soft undecorative material.

Obviously the invention is not limited to the details of the illustrative embodiment thereof herein described since these details may be variously modified. Moreover, it is not indispensable that all features of the invention be used conjointly since various features may be advantageously employed in different combinations and subcombinations.

Having described my invention, I claim:

1. A decorative, sound absorbing wall surface comprising in combination a wall structure faced with a plurality of relatively thin wall slabs each consisting of a mass of coarse wood shaving cemented together by a decorative cement, said shavings lying at random in the mass to produce a multitude of enlarged irregular cavities in the interior of the mass and extending at least half way through the slab, said cavities opening on the face of the material in substantially large openings which permit the effective entrance of sound waves, said mass having a smooth durable face and the cement partly closing said openings to said cavities, the wood shavings in said cavities presenting irregular surfaces which in conjunction with said cavities serve to absorb sound vibrations striking the wall.

2. A decorative, sound absorbing wall surface comprising in combination a wall structure faced with a plurality of relatively thin wall slabs each consisting of a mass of coarse wood shavings cemented together by a decorative cement, said shavings lying at random in the mass to produce a multitude of enlarged irregular cavities in the interior of the mass, which open on the face thereof in relatively large openings to permit the effective entrance of sound waves, said cavities extending into the interior a substantial distance as compared with the openings into said cavities said mass having a smooth durable face and the cement partly closing said openings to said cavities, said cavities serving to absorb sound vibrations striking the wall.

3. A decorative acoustical surfacing material comprising in combination a solidified mass of wood shavings cemented together with oxychloride cement and containing a pigment, said shavings lying at random in the mass to produce a multitude of enlarged irregular empty cavities on the interior of the mass, which open on the face thereof in substantially large openings which permit the effective entrance of sound waves, said mass having a durable, decorative face of cement capable of withstanding contact, the cement partly closing said openings to said cavities to permit sound absorption by reflection and interference of the sound waves within the cavities, said cement exhibiting on its face an irregular distribution of color.

4. A decorative acoustical surfacing material comprising in combination a solidified mass of wood shavings cemented together with magnesia cement and containing a pigment, said shavings lying at random in the mass to produce a multitude of enlarged irregular cavities on the interior of the mass, which open on the face thereof in substantially large openings which permit the effective entrance of sound waves, said mass having a durable, decorative face of cement and the cement partly closing said openings to said cavities, said pigment being irregularly distributed on the face of said material to give a mottled color effect.

5. A decorative sound absorbing surfacing material comprising in combination a solidified mass of wood shavings cemented together with magnesia cement and containing a pigment, said shavings lying at random in the mass to produce a multitude of enlarged irregular cavities on the interior of the mass, which open on the face thereof in relatively large openings which permit the effective entrance of sound waves, said mass having a hard durable decorative face formed by said cement, said pigment being irregularly distributed on the face of said material to give a mottled color effect.

6. The method of making decorative sound absorbing surfacing material which is characterized by molding a loose mixture of wood shavings and a decorative plastic cement, and tamping said material in the mold by applying tamping pressure successively to small areas of the mass so as not to cause a substantial flow of the plastic cement to the face of the mold, and then permitting said mass to set and harden.

7. The method of making decorative sound absorbing surfacing material which is characterized by molding a loose mixture of wood shavings and a decorative plastic cement of soupy consistency, and tamping the material into a greased mold with tamping pressures which preserve the random arrangement of shavings which form sound absorbing cavities in the mass, continuing said tamping operations until cement collects at the face of the mold to partially close the openings to said cavities in the face of the material, and permitting said cement to set and cement said shavings together.

8. The method of making decorative sound absorbing surfacing material which is characterized by molding a loose mixture of dry wood shavings and a decorative plastic cement of soupy consistency having a coloring pigment therein, said shavings being substantially greater in bulk than the cement, tamping the material into a greased mold so as to smooth down the shavings on the back of the molded mass, said tamping operation preserving the random arrangement of shavings in said mass and being continued until cement collects at the face of the mold to partially close the openings of said cavities in the face of the material.

In witness of the foregoing I affix my signature.

LON EDWARD WELCH.